[67.] No. 4,538. S. W. Collins Reissued Aug. 29, 1871.

*Process for Making Articles of Steel etc.*

Witnesses.
Sarah J. Simonds
T. E. Steele

Inventors
Assigne
The Collins Compan
By N. E. Simonds Att

AM. PHOTO-LITHOGRAPHIC CO. N.Y. (OSBORNE'S PROCESS.)

UNITED STATES PATENT OFFICE.

THE COLLINS COMPANY, OF COLLINSVILLE, CONNECTICUT, ASSIGNEE OF SAMUEL W. COLLINS, DECEASED.

IMPROVEMENT IN CASTING EDGE AND OTHER TOOLS.

Specification forming part of Letters Patent No. 30,668, dated November 20, 1860; reissue No. 4,538, dated August 29 1871.

DIVISION B.

*To all whom it may concern:*

Be it known that SAMUEL W. COLLINS, of Collinsville, in the county of Hartford and State of Connecticut, invented certain Improvements in the Manufacture of Edge-Tools, and other tools and implements and other articles, of steel or steel and iron combined, of which the following is a specification:

This invention consists in a new process for the manufacture of axes, adzes, hammers, and edged and faced tools generally, and similar articles, either of steel of one grade wholly, of steel of different grades, or partly of steel and partly of iron, by first casting these metals into a blank closely approaching the shape of the finished article, except that the part which is to form the edge, face, or similar part of the article is left blunt and thick, which blunt and thick part is afterward wrought, by hammering or similar manipulation, into the shape of the finished forging, for the purpose of adapting it to its work.

Figure 2:
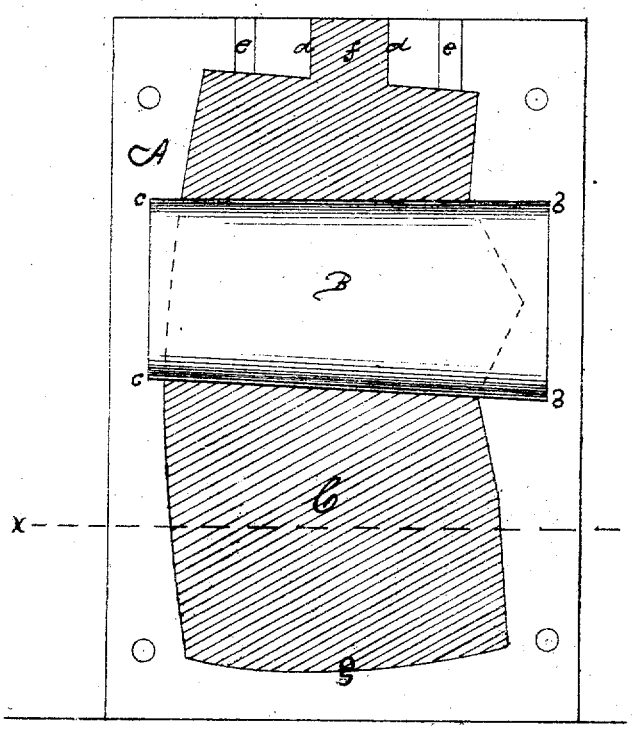
Figure 7:
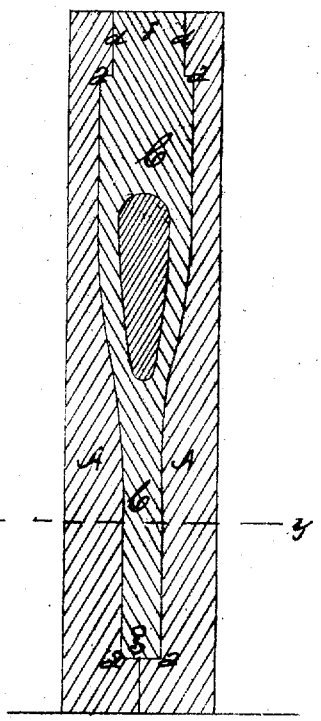

First, with reference to Figures 1 and 2, A A indicate the halves of a mold, made either of iron or other material, each of the halves containing one-half of the cavity *a a a*, in which the ax is formed, half of each of the two cavities *b b* and *c c*, which hold the ends of the eye-core B, half the pouring-gate *d*, and half of each of the vent-holes *e e*. These parts of the mold are made to fit accurately together by means of the common steady-pins, and are held together, when in use, by the common clamps. C indicates the casting, and *f* the sprue.

This casting for an ax may be made all of one quality of steel, or of steel of different qualities, or partly of iron and partly of steel, by pouring while in a molten state into the mold these metals one after another successively, thereby uniting the different metals perfectly by fusion.

The process for making articles of different metals, as just mentioned, is covered by a reissued patent to the patentee herein, of even date herewith.

The lower part *g* of the ax-blank is left blunt and thick, and is afterward hammered or otherwise similarly manipulated down to an edge.

The articles which are susceptible of manufacture in this way are almost numberless. The saving of labor accomplished by this process is most important and considerable. The tool can be cast with the whole of its main body closely conforming to the shape of the finished article, thus dispensing with the punching, swaging, and forging processes, which are expensive. Then, by drawing the blunt edge, face, or similar part down to a true edge, face, or similar part, under a hammer or by other similar manipulation, the steel in such edge, face, or similar part is rendered dense, firm, and compact, so as to be fit for its work. All air-holes and other similar imperfections are cured. The body of the tool is firm and strong enough to stand the work it is called upon to perform in the state in which it is cast, while the edge, face, or similar part is as perfectly adapted to its work as if the whole tool had been produced by forging or other similar process.

The edge, face, or similar part of the tool is of course to be of steel, whatever the body of the tool may be.

It is known that it has been suggested to make useful and ornamental articles of malleable cast-iron having part of their shape made in the mold and their form completed by forging, the object being to produce a certain shape of article without any reference to changing the interior condition and molecular structure of the casting for any purpose, and also that it has been suggested to cast an ingot of low-grade steel in form roughly resembling a railway rail, which ingot was afterward to be rolled over its whole extent to give it the shape of a finished rail, and this without any reference to changing the interior or molecular structure of the ingot for any particular purpose; and no claim is made to either of these; but this process differs broadly from those indicated, in that the body of the tool is cast to exactly the desired shape, while the part designed to afterward form the edge, face, or similar part is left blunt and thick, which blunt and thick part is afterward to be wrought, by hammering or similar manipulation, for the purpose of expelling and curing all flaws of casting, to render the steel at this point dense, firm, and compact, and to change the molecular structure of the steel, so as to adapt it to cutting, hammering, and the like.

In division A of these reissued Letters Patent I have claimed as my invention the process of casting any article partly of iron and partly of steel, or of different qualities of steel, by pouring into a mold, in a melted state, these metals, one after another, in immediate succession, thereby effecting a union between them by fusion, substantially in the manner and for the purpose set forth in the specification of said division A. I do not claim as my invention in this division of these reissued Letters Patent the process set forth and claimed in said division A.

Applicant claims as this invention—

The process of making edged, faced, or similar tools, with an edge, face, or similar part of steel, by first casting a blank of steel, or of steel and iron combined, the body of which closely conforms to the shape of the finished article, but with the part which is to form the edge, face, or similar part blunt and thick, and afterward, by hammering or other similar manipulation, working such blunt and thick part into the shape of the completed article, for the purpose set forth.

THE COLLINS COMPANY,
By W. I. WOOD,
*Vice-President and Chief Executive Officer.*

Witnesses:
OLIVER F. PERRY,
ALBERT L. THAYER,
J. H. BIDWELL.

(67.)